(12) United States Patent
Szor

(10) Patent No.: US 7,437,759 B1
(45) Date of Patent: *Oct. 14, 2008

(54) KERNEL MODE OVERFLOW ATTACK PREVENTION SYSTEM AND METHOD

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 810 days.

This patent is subject to a terminal disclaimer.

(21) Appl. No.: 10/781,207

(22) Filed: Feb. 17, 2004

(51) Int. Cl.
G06F 11/00 (2006.01)

(52) U.S. Cl. ............... 726/22; 726/23; 726/24; 726/25; 713/164

(58) Field of Classification Search ........... 726/22–25; 713/164, 191, 188, 190, 324, 165, 167; 710/74, 710/107; 709/216, 217
See application file for complete search history.

(56) References Cited

U.S. PATENT DOCUMENTS

| | | | |
|---|---|---|---|
| 5,598,531 A | 1/1997 | Hill | 395/186 |
| 5,696,822 A | 12/1997 | Nachenberg | 380/4 |
| 5,802,178 A | 9/1998 | Holden et al. | 380/49 |
| 5,822,517 A | 10/1998 | Dotan | 395/186 |
| 5,864,683 A * | 1/1999 | Boebert et al. | 709/249 |
| 6,092,136 A * | 7/2000 | Luedtke | 710/107 |
| 6,199,181 B1 | 3/2001 | Rechef et al. | 714/38 |
| 6,301,699 B1 | 10/2001 | Hollander et al. | 717/4 |
| 6,357,008 B1 | 3/2002 | Nachenberg | 713/200 |
| 6,658,571 B1 | 12/2003 | O'Brien et al. | 713/200 |
| 6,718,414 B1 | 4/2004 | Doggett | 710/267 |
| 6,820,146 B2 * | 11/2004 | Cox | 710/74 |
| 6,910,142 B2 * | 6/2005 | Cross et al. | 713/324 |
| 7,085,928 B1 | 8/2006 | Schmid et al. | 713/164 |
| 7,146,305 B2 | 12/2006 | van der Made | |
| 7,181,603 B2 | 2/2007 | Rothrock et al. | |
| 7,216,367 B2 * | 5/2007 | Szor | 726/25 |
| 7,228,563 B2 * | 6/2007 | Szor | 726/22 |
| 2002/0083334 A1 | 6/2002 | Rogers et al. | |
| 2003/0014667 A1 | 1/2003 | Kolichtchak | |
| 2004/0255163 A1* | 12/2004 | Swimmer et al. | 713/201 |

OTHER PUBLICATIONS

Choi et al., "A New Stack Buffer Overflow Hacking Defense Technique with Memory Address Confirmation", *ICICS 2001: 4th International Conference*, Seoul, Korea, Dec. 6-7, 2001, Proceedings, pp. 146-159. Retrieved from the Internet: <URL:http://www.springerlink.com/content/x8tn836pk6wyp8kw/fulltext.pdf>.

(Continued)

*Primary Examiner*—Van H Nguyen
(74) *Attorney, Agent, or Firm*—Gunnison, McKay & Hodgson, L.L.P.; Serge J. Hodgson

(57) ABSTRACT

A method includes hooking a critical operating system function, stalling a call to the critical operating system function originating from a call module, determining a location of the call module in a kernel address space of a memory, and determining whether the location is in a driver area of the kernel address space. Upon a determination that the call module is not in the driver area, the method further includes taking protective action to protect a host computer system. In this event, it is highly likely that the call module is malicious code that has been injected into the kernel stack/heap through a malicious kernel mode buffer overflow attack. By taking protective action, exploitation, damage or destruction of the host computer system is prevented.

16 Claims, 5 Drawing Sheets

OTHER PUBLICATIONS

Xenitellis, "Security Vulnerabilities in Event-Driven Systems", *Conference on Security in the Information Society: Visions and Perspectives*, Cairo, Egypt, May 7-9, 2002, Proceedings, pp. 147-160. Retrieved from the Internet: <URL:http://www.isg.rhul.ac.uk/~simos/pub/OLD/SecurityVulnerabilitiesInEvent-drivenSystems.pdf>.

Vasudevan et al., "SPiKE: Engineering Malware Analysis Tools using Unobtrusive Binary-Instrumentation", *Conferences in Research and Practice in Information Technology*, vol. 48, Australian Computer Society, Inc., Jan. 2006, pp. 1-10. Retrieved from the Internet on Dec. 1, 2006 from <URL:http://crpit.com/confpapers/CRPITV48Vasudevan.pdf>.

Szor, P., U.S. Appl. No. 10/360,341, filed Feb. 6, 2003, entitled "Shell Code Blocking System and Method".

Szor, P., U.S. Appl. No. 10/371,945, filed Feb. 21, 2003, entitled "Safe Memory Scanning".

Szor, P., U.S. Appl. No. 10/464,091, filed Jun. 17, 2003, entitled "Send Blocking System and Method".

Szor, P., U.S. Appl. No. 10/611,472, filed Jun. 30, 2003, entitled "Signature Extraction System and Method".

Szor, P., U.S. Appl. No. 10/681,623, filed Oct. 7, 2003, entitled "Unmapped Code Blocking System and Method".

Szor, P., "*Attacks on WIN32*", Virus Bulletin Conference, Oct. 1998, Virus Bulletin Ltd, The Pentagon, Abingdon, Oxfordshire, England, pp. 57-84.

Szor, P., "*Memory Scanning Under Windows NT*", Virus Bulletin Conference, Sep. 1999, Virus Bulletin Ltd, The Pentagon, Abingdon, Oxfordshire, England, pp. 1-22.

Szor, P., "*Attacks on WIN32-Part II*", Virus Bulletin Conference, Sep. 2000, Virus Bulletin Ltd, The Pentagon, Abingdon, Oxfordshire, England, pp. 47-68.

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd, The Pentagon, Abingdon, Oxfordshire, England, pp. 1-36.

Buysse, J., "*Virtual Memory: Windows NT® Implementation*", pp. 1-15 [online]. Retrieved on Apr. 16, 2003. Retrieved from the internet: URL:http://people.msoe.edu/~barnicks/courses/cs384/papers19992000/buyssej-Term.pdf.

Dabak, P., Borate, M. and Phadke, S., "*Hooking Windows NT System Services*", pp. 1-8 [online]. Retrieved on Apr. 16, 2003. Retrieved from the internet: URL:http://www.windowsitlibrary.com/Content/356/06/2.html.

"*How Entercept Protects: System Call Interception*", pp. 1-2 [online]. Retrieved on Apr. 16, 2003. Retrieved from the internet: URL:http://www.entercept.com/products/technology/kernekmode.asp. No author provided.

"*How Entercept Protects: System Call Interception*", p. 1 [online]. Retrieved Apr. 16, 2003. Retrieved from the internet: URL:http://www.entercept.com/products/technology/interception.asp. No author provided.

Kath, R., "*The Virtual-Memory Manager in Windows NT*", pp. 1-11 [online]. Retrieved on Apr. 16, 2003. Retrieved from the internet: URL:http://msdn.microsoft.com/library/en-us/dngenlib/html/msdn_ntvmm.asp?frame=true.

Szor, P. and Kaspersky, E., "*The Evolution of 32-Bit Windows Viruses*", Windows & .NET Magazine, pp. 1-4 [online]. Retrieved on Apr. 16, 2003. Retrieved from the internet: URL:http://www.winnetmag.com/Articles/Print.cfm?ArticleID=8773.

Szor, P., "*The New 32-bit Medusa*", Virus Bulletin, Dec. 2000, Virus Bulletin Ltd, The Pentagon, Abingdon, Oxfordshire, England, pp. 8-10.

Szor, P., "*Shelling Out*", Virus Bulletin, Feb. 1997, Virus Bulletin Ltd, The Pentagon, Abingdon, Oxfordshire, England, pp. 6-7.

McCorkendale, B. and Szor, P., "*Code Red Buffer Overflow*", Virus Bulletin, Sep. 2001, Virus Bulletin Ltd, The Pentagon, Abingdon, Oxfordshire, England, pp. 4-5.

Nachenberg, C., "*A New Technique for Detecting Polymorphic Computer Viruses*", University of California, Los Angeles, 1995.

"*Info: CreateFileMapping ( ) SEC_\* Flags*", pp. 1-2 [online]. Retrieved on Sep. 24, 2003. Retrieved from the internet: URL:http://support.microsoft.com/default.aspx?scid=http://support.microsoft.com:80/support/kb/articles/Q108/2/31.asp&NoWebContent=1. No author provided.

"*CreateFileMapping*", pp. 1-5 [online]. Retrieved on Sep. 10, 2003. Retrieved from the internet: URL:http://msdn.microsoft.com/library/en-us/fileio/base/createfilemapping.asp?frame=true. No author provided.

Finnegan, "Pop Open a Privileged Set of APIs with Windows NT Kernel Mode Drivers", *Microsoft Systems Journal*, Microsoft Corp., Mar. 1998, pp. 1-24 [online]. Retrieved on Jul. 25, 2007 from the Internet: <URL:http://www.microsoft.com/MSJ/0398-driver.aspx>.

Vasudevan et al., "Cobra: Fine-grained Malware Analysis using Stealth Localized-executions", 2006, pp. 1-15 [online]. Retrieved from the Internet: <URL:http://data.uta.edu/~ramesh/pubs/IEEE-Cobra.pdf>.

\* cited by examiner

KERNEL MODE OVERFLOW ATTACK PREVENTION SYSTEM AND METHOD

BACKGROUND OF THE INVENTION

1. Field of the Invention

The present invention relates to the protection of computer systems. More particularly, the present invention relates to a behavior-blocking system and method.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code, sometimes called shell code, into the execution flow.

In the case of a kernel mode buffer overflow attack, the attacker gains kernel mode privilege of the host computer system. Because kernel mode privilege is the highest privilege, the attacker has the ability to do essentially anything on the host computer system, including reprogramming of the processor or other devices of the host computer system thus seriously damaging, destroying or otherwise exploiting the host computer system.

SUMMARY OF THE INVENTION

A method includes hooking a critical operating system function, stalling a call to the critical operating system function originating from a call module, determining a location of the call module in a kernel address space of a memory, and determining whether the location is in a driver area of the kernel address space. Upon a determination that the call module is not in the driver area, the method further includes taking protective action to protect a host computer system. In this event, it is highly likely that the call module is malicious code that has been injected into the kernel stack/heap through a malicious kernel mode buffer overflow attack. By taking protective action, exploitation, damage or destruction of the host computer system is prevented.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 3:
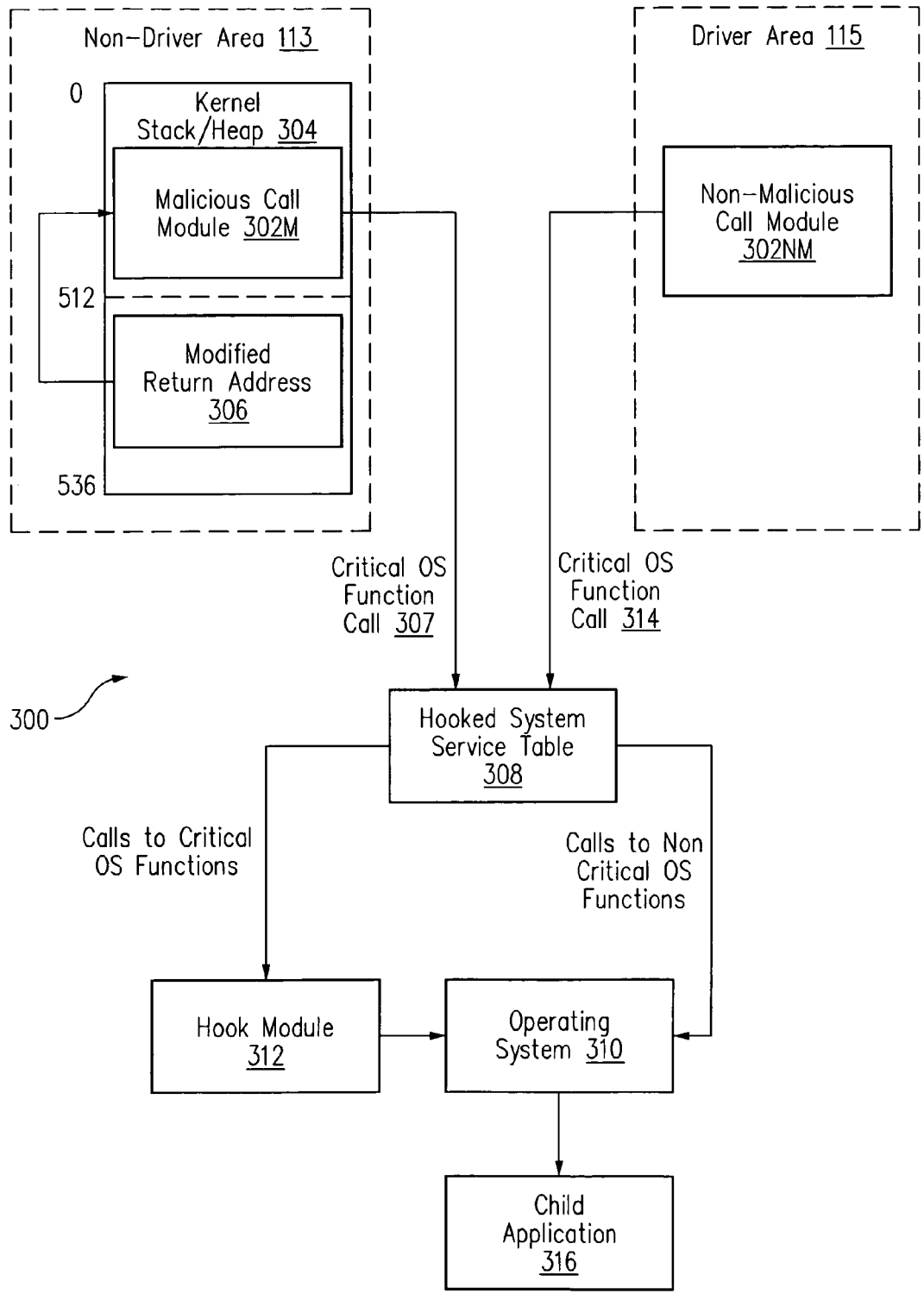
FIG. 3 is a diagram of a hooked operating system function call flow in accordance with one embodiment of the present invention.

In accordance with one embodiment, referring to FIG. 3, a method includes hooking a critical operating system function, for example, using a hooked system service table 308. The method further includes stalling a critical OS function call 307 to the critical operating system function originating from a malicious call module 302M of a parent application. The method further includes determining whether malicious call module 302M is in a driver area 115 of a kernel address space of a memory. Upon a determination that malicious call module 302M is not in driver area 115, the method further includes terminating critical OS function call 307 or taking other protective action to protect a host computer system.

In this event, it is highly likely that call module 302M is malicious code that has been injected into kernel stack/heap 304 through a malicious kernel mode buffer overflow attack. By terminating critical OS function call 307, exploitation, damage or destruction of the host computer system is prevented.

Figure 1:
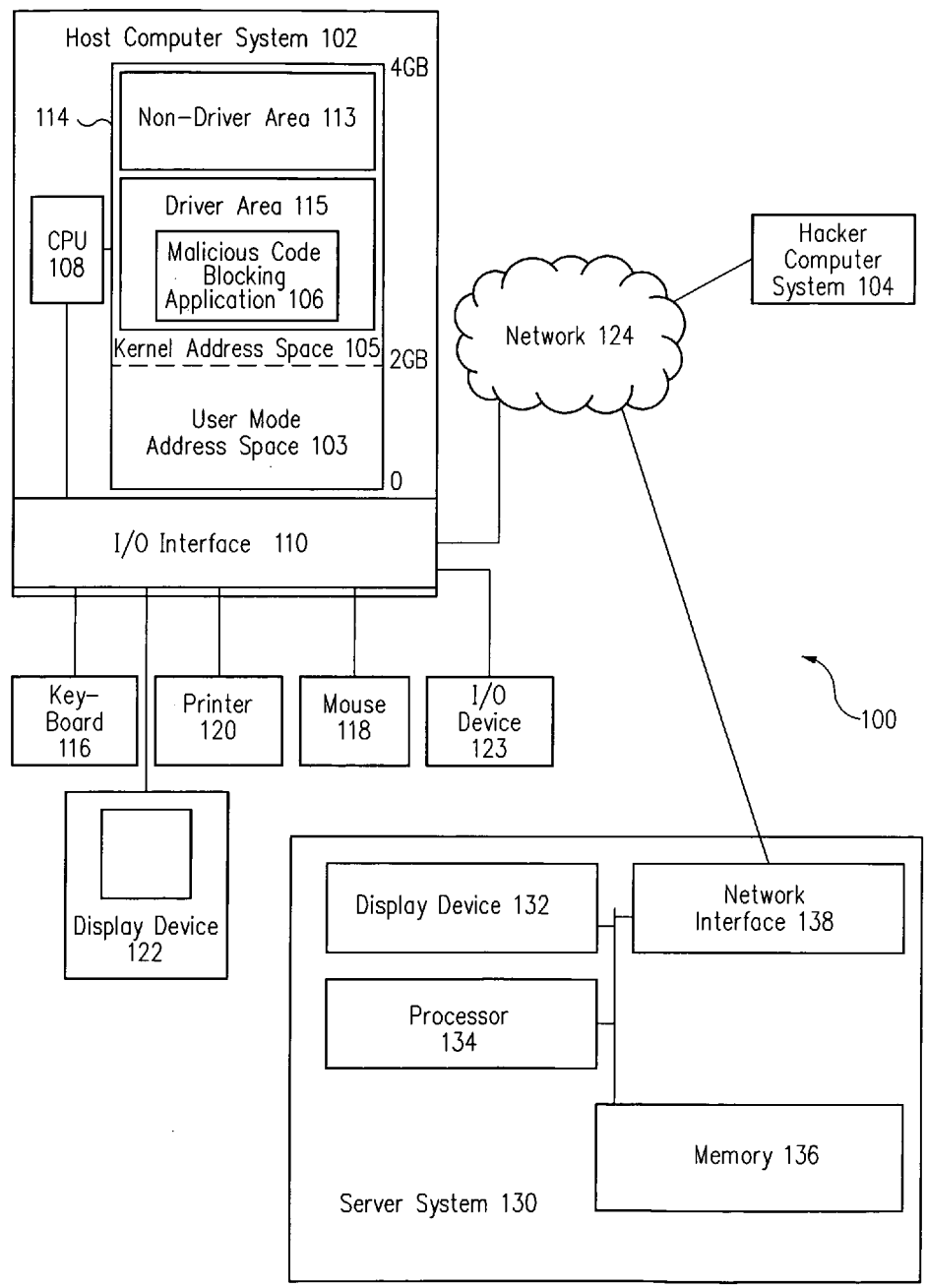
FIG. 1 is a diagram of a client-server system that includes a malicious code blocking application executing on a host computer system in accordance with one embodiment of the present invention.

More particularly, FIG. 1 is a diagram of a client-server system 100 that includes a malicious code blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, malicious code blocking application 106 is loaded into host computer system 102 via I/O device 123, such as from a CD, DVD or floppy disk containing malicious code blocking application 106.

In one embodiment, memory 114 includes a page based virtual memory system that uses pages, e.g., 4096 byte memory areas. More particularly, Windows® NT and Windows® 2000 provide page-based virtual memory management schemes that permit programs to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system. Thus, memory 114 includes a user mode address space 103 and a kernel address space 105.

In Windows® NT and Windows® 2000, memory is divided into equal portions termed pages. For example, on 32-bit Intel architectures, also known as IA32, pages are 4 KB in size, whereas Windows® 2000 on an Alpha CPU would use 8 KB pages. Thus, in one embodiment, user mode address space 103 and kernel address space 105 include pages.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions. Further, kernel mode programs, sometimes called drivers or kernel mode drivers, also utilize system calls to utilize other kernel mode code functionalities, such as access to disk drives and network connections.

In a kernel mode buffer overflow attack, e.g., from a hacker computer system 104, an attacker overflows extra data into the kernel stack or the kernel heap in the kernel address space, e.g., by exploiting a buggy driver. In this manner, it is possible to corrupt valid data in the kernel address space and possibly to change the execution flow and instructions. Thus, by exploiting a kernel mode buffer overflow, it is possible to inject malicious code, sometimes called shell code, into the kernel address space.

To illustrate, one example of a kernel mode buffer overflow vulnerability is incorrectly known as the "WebDAV" vulnerability. Indeed, the vulnerability was first discovered in NTDLL.DLL in user mode; associated with the WebDAV application of Microsoft, Inc. as one possible exploitation of several possibilities. More particularly, this vulnerability exists in NTOSKRNL.EXE, where RtlInitUnicodeString( ) is presented for use of the drivers in kernel mode.

Further, kernel mode buffer overflow attacks are increasingly common, as the trend is to move more and more code to the more secure kernel address space. For example, Microsoft, Inc. has moved components such as HTTP parsing into the kernel address space.

Kernel address space 105 is divided into a non-driver area 113 and a driver area 115. Non-driver area 113, sometimes called a kernel data area, includes the kernel stack and the kernel heap.

In one embodiment, non-driver area 113 and driver area 115 are predefined areas of kernel address space 105. For example, non-driver area 113 occupies the upper address space of kernel address space 105, e.g., non-driver area 113 is the address space between XGB and 4 GB, where X is greater than 2 and less than 4. In contrast, driver area 115 occupies the lower address space of kernel address space 105, e.g., driver area 115 is the address space between 2 GB and XGB, again where X is greater than 2 and less than 4. In accordance with this embodiment, driver area 115 is static or virtually static, i.e., is a fixed area that does not change because drivers are loaded upon booting of host computer system 102 and dynamic driver loading is not support such that loading and unloading of drivers does not occur once host computer system 102 is up and running.

In another embodiment, driver area 115 is the area of kernel address space 105 occupied by a loaded kernel mode driver, i.e., the area of kernel address space 105 containing non-malicious code. Generally, a kernel mode driver, sometimes called a driver, is non-malicious kernel mode code, i.e., non-malicious code within kernel address space 105 including the operating system. More specifically, the operating system is a kernel mode driver as used herein.

In one embodiment, the kernel mode drivers are formatted as Portable Executable (PE) files. A PE file is an executable file format commonly used in Windows® systems.

Generally, a PE file includes a DOS MZ header, a DOS stub, a PE header, a section table, and a plurality of sections. The section table is an array of structures that contains the information about each section in the PE file such as its attribute, the file offset, and virtual offset. Each section is simply a block of code and/or data with common attributes. Once mapped into memory, sections start on at least a page boundary, e.g., the first byte of each section corresponds to a memory page. The PE format is documented in Windows® NT and Windows® 2000 software developer's kits (SDKs) (available from Microsoft, Inc. of Redmond, Wash.) and is well-known to those of skill in the art and not further described herein.

In accordance with this embodiment, driver area 115 is the area of kernel address space 105 occupied by a portable executable file, e.g., a DOS MZ header, a DOS stub, a PE header, a section table, or a plurality of sections associated with the PE file, i.e., any part of the PE file. Non-driver area 113 is the remaining area of kernel address space 105, i.e., any area of kernel address space 105 that is not occupied, sometimes called unoccupied, by any part of a portable executable file.

In accordance with another embodiment, driver area 115 is the area of kernel address space 105 occupied by an executable section of a portable executable file, sometimes called an executable section of a kernel mode driver. In accordance with this embodiment, non-driver area 113 is the remaining area of kernel address space 105, i.e., any area of kernel address space 105 that is not occupied by an executable section of a portable executable file. Thus, in accordance with this embodiment, non-driver area 113 includes any area of kernel address space 105 that is not occupied by any part of a driver such as a portable executable file and also includes any data (non-executable) sections of a driver such as any part of a portable executable file that is not an executable section.

Host computer system 102 is coupled to a server system 130 of client-server system 100 by a network 124. Server system 130 typically includes a display device 132, a processor 134, a memory 136, and a network interface 138.

Further, host computer system 102 is also coupled to hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Malicious code blocking application 106 is stored in driver area 115 of kernel address space 105 of memory 114 of host computer system 102 and executed on host computer system 102. In one embodiment, malicious code blocking application 106 is a kernel mode driver. The particular type of and configuration of host computer system 102, hacker computer system 104, and server system 130 are not essential to this embodiment of the present invention.

Figure 2:
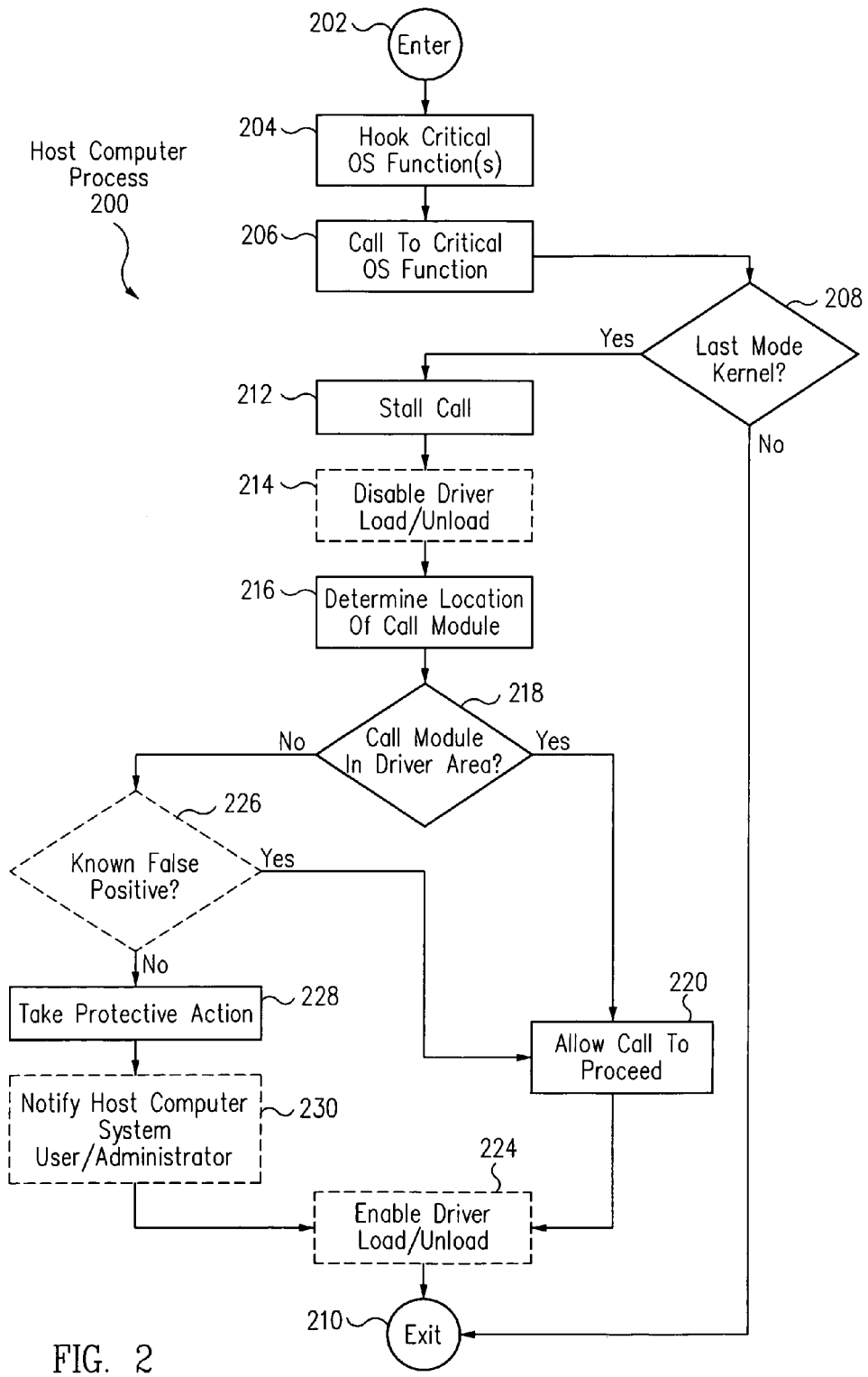
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of malicious code blocking application 106 by processor 108 results in the operations of host computer process 200 as described below in one embodiment.

From an enter operation 202, flow moves to a hook critical operating system (OS) function(s) operation 204. In hook critical OS function(s) operation 204, the critical operating system functions, e.g., at least one critical operating system function, of host computer system 102 are hooked. In one embodiment, a system level, e.g., a kernel mode module or kernel mode driver, hooks the critical operating system functions in kernel mode. Further, in one embodiment, an operating system function is hooked by redirecting calls to the operating system function, for example, to a hook module in accordance with an embodiment of the present invention. In another embodiment, an operating system function, sometimes called API, is hooked by inserting a jump directly into the operating system function. For example, ZwCreateFile( ) is hooked through insertion of a jump instruction.

In one embodiment, an operating system function is critical if it is necessary for a first application, e.g., a parent application, to cause executed of a second application, e.g., a child application. In one particular embodiment, an operating system function is critical if it is necessary or likely to be used by a malicious parent application, e.g., an application that contains malicious code, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

As is well known to those of skill in the art, system calls expose all kernel functionality that both kernel mode and user-mode programs require. Kernel mode and user-mode programs need to utilize the functionality provided by the kernel, for example, to access disk drives, network connections, and shared memory. In accordance with one embodiment, system calls include critical OS function calls and non-critical OS function calls.

In one embodiment, on a Windows® operating system, the PsCreateSystemThread( ) and PsCreateWin32Process( ) functions are critical OS functions. In another embodiment, on a UNIX or UNIX like operating system, execve( ), execl( ), execlp( ), execle( ), exect( ), execv( ), and/or execvp( ) system functions are critical OS functions.

In one embodiment, the INT 2E instruction, i.e., an interrupt, is a critical OS function that is hooked in hook critical OS function(s) operation 204. The INT 2E instruction is used by user mode programs to switch from the user mode to the kernel mode and execute a requested operating system function, sometimes called system service. The INT 2E instruction is also used by kernel mode programs to execute a requested operating system function, sometimes called system service. Each operating system function in the kernel is identified by a service ID.

In one particular embodiment, a wrapper function fills in the service ID of the requested operating system function in the EAX register, fills in the pointer to the stack frame of the parameters in the EDX register, and issues the INT 2E instruction. The service ID in the EAX register can be associated with the corresponding operating system function, for example, by traversing the exported functions of NTDLL.DLL. The INT 2E instruction changes the processor to the kernel mode if the processor is in user mode, and the processor starts executing the handler specified for the INT 2E instruction in the interrupt descriptor table (IDT). By hooking the INT 2E instruction, a majority of the critical operating system functions are hooked at a single location.

From hook critical OS function(s) operation 204, flow moves to a call to critical OS function operation 206. In call to critical OS function operation 206, a call, sometimes called a critical OS function call, to a critical OS function is made by a call module of a parent application. The parent application may be malicious or non-malicious. More particularly, a critical OS function call is made by a call module of a parent application to an OS function that was hooked in hook critical OS function(s) operation 204.

In accordance with one embodiment of the present invention, a call module includes the critical OS function call instruction(s), i.e., the instruction or set of instructions that originates the critical OS function call. The call module may be malicious or non-malicious. The parent application includes the call module, or, in one embodiment, the parent application is the call module.

From call to critical OS function operation 206, flow moves to a last mode kernel check operation 208. In last mode kernel check operation 208, a determination is made as to whether the last mode of operation was the kernel mode.

If a determination is made that the last mode of operation was not the kernel mode, i.e., was the user mode, flow moves to and exits at an exit operation 210 or returns to call to critical OS function operation 206. In one embodiment, if the critical OS function call is made by a user mode call module, the last mode of operation is the user mode. In another embodiment, a bit, e.g., of a kernel mode object, is checked to determine if the last mode of operation was the kernel mode or the user mode.

In a conventional kernel mode buffer overflow attack, a malicious call module containing malicious code is loaded into the kernel stack or kernel heap in non-driver area 113 of kernel address space 105 and executed, e.g., because of a modified return address. For example, a kernel mode buffer overflow is exploited from hacker computer system 104.

Accordingly, if a determination is made that the last mode of operation was not the kernel mode, i.e., was the user mode, the critical OS function call is not originating from execution of a malicious call module containing malicious code loaded into the kernel stack or kernel heap in non-driver area 113 of kernel address space 105 and thus flow moves to and exits at exit operation 210. In this manner, the impact of malicious code blocking application 106 on the performance of host computer system 102 is minimized.

Conversely, if a determination is made that the last mode of operation was the kernel mode, flow moves to a stall call operation 212. In this event, the critical OS function call may be originating from execution of a malicious call module containing malicious code loaded into the kernel stack or kernel heap in non-driver area 113 of kernel address space 105 and thus further operations are performed.

In stall call operation 212, the critical OS function call of operation 206 to the critical OS function is stalled, i.e., is prevented from reaching the operating system. By stalling the critical OS function call, execution of the critical OS function is stalled.

From stall call operation 212, flow moves, optionally, to a disable driver load/unload operation 214 (or directly to a determine location of call module operation 216 if disable driver load/unload operation 214 is not performed). In disable driver load/unload operation 214, loading and unloading of drivers in kernel address space 105 is disabled, sometimes called suspended.

For example, as discussed above, in various embodiments, driver area 115 is the area of kernel address space 105 occupied by a loaded kernel mode driver or by executable sections of a loaded kernel mode driver. In accordance with these embodiments, driver area 115 is dynamic.

More particularly, during the normal operations of host computer system 102, kernel mode drivers are loaded into and unloaded from kernel address space 105. To illustrate, when a kernel mode driver is loaded into kernel address space 105, driver area 115 changes to include the area of kernel address space 105 occupied by the newly loaded kernel mode driver and non-driver area 113 changes to not include the area of kernel address space 105 occupied by the newly loaded kernel mode driver. To further illustrate, when a kernel mode driver is unloaded from kernel address space 105, driver area 115 changes to not include the area of kernel address space 105 no longer occupied by the unloaded kernel mode driver and non-driver area 113 changes to include the area of kernel address space 105 no longer occupied by the unloaded kernel mode driver. By disabling loading and unloading of drivers in disable driver load/unload operation 214, the state of non-driver area 113 and driver area 115 existing when the critical OS function call is stalled is preserved.

In another embodiment, non-driver area 113 and driver area 115 are predefined areas of kernel address space 105. In accordance with this embodiment, driver area 115 is static and does not change. Accordingly, disabling loading and unloading of drivers is unnecessary to preserve the state of non-driver area 113 and driver area 115. Thus, disable driver load/unload operation 214 is not performed in this embodiment.

From disable driver load/unload operation 214 (or directly from stall call operation 212 if disable driver load/unload operation 214 is not performed), flow moves to a determine location of call module operation 216. In determine location of call module operation 216, the location in kernel address space 105 of memory 114 of the call module that originated the critical OS function call of operation 206 to the critical OS function is determined.

More particularly, in determine location of call module operation 216, a determination is made as to whether the call module is located in driver area 115 or non-driver area 113 of kernel address space 105 of memory 114. In one embodiment, a stack trace-back operation, e.g., a stack analyzer routine, is used to determine the location in kernel address space 105 of the call module as discussed below with reference to FIG. 4. For example, the return address of the INT 2E instruction points to the location in kernel address space 105 of the call module.

From determine location of call module operation 216, flow moves to a call module in driver area check operation 218. In check operation 218, a determination is made as to whether the call module is in driver area 115 of kernel address space 105 of memory 114. If a determination is made in check operation 218 that the call module is in driver area 115 of kernel address space 105 of memory 114, flow moves to an allow call to proceed operation 220.

In allow call to proceed operation 220, the critical OS function call is allowed to proceed. More particularly, the critical OS function call is passed to the operating system. As discussed above, the critical OS function call was stalled in stall call operation 212. From allow call to proceed operation 220, flow moves to an optional enable driver load/unload operation 224 (or directly to exit operation 210 if enable driver load/unload operation 224 is not performed) or waits for the next critical OS function call and returns to operation 206.

In one embodiment, if driver loading/unloading was disabled in disable driver load/unload operation 214, enable driver load/unload operation 224 is performed to enable, sometimes called unsuspend, loading/unloading of drivers. From enable driver load/unload operation 224, flow moves to and exits at exit operation 210 or waits for the next critical OS function call and returns to operation 206.

In one embodiment, because the call module that originated the critical OS function call is determined to be in driver area 115 of kernel address space 105 of memory 114 in check operation 218, the likelihood that the call module is malicious code is minimal. In one embodiment, malicious code is defined as any computer program, module, set of modules, or code that enters a computer system without an authorized user's knowledge and/or without an authorized user's consent.

However, if a determination is made in check operation 218 that the call module is not in driver area 115 of kernel address space 105 of memory 114, e.g., is in non-driver area 113, the likelihood that the call module is malicious code is significant. Thus, if a determination is made in check operation 218 that the call module is in non-driver area 113, flow moves to, optionally, a known false positive check operation 226.

In known false positive check operation 226, a determination is made as to whether the call module, which has been determined to be in non-driver area 113, is a known false positive call module. In one embodiment, a known false positive call module is a call module that is in non-driver area 113, but that is, in fact, safe, i.e., does not contain malicious code. Known false positive check operation 226 is optional and in one embodiment is not performed.

If a determination is made that the call module is a known false positive call module, flow moves from known false positive check operation 226 to allow call to proceed operation 220, which is performed as discussed above.

Conversely, if a determination is made that the call module is not a known false positive call module in known false positive check operation 226, flow moves to a take protective action operation 228.

In take protective action operation 228, protective action is taken to prevent the malicious code of the call module from damaging, destroying or otherwise exploiting host computer system 102. For example, the critical OS function call is terminated. More particularly, the critical OS function call is not passed to the operating system but is terminated. As discussed above, the critical OS function call was stalled in stall call operation 212.

By terminating the critical OS function call, the malicious code of the call module is prevented from damaging, destroying or otherwise exploiting host computer system 102. In one embodiment, by terminating the critical OS function call, a child application is prevented from being executed. By preventing execution of the child application, remote access is denied thus preventing unauthorized access by malicious hackers as well as by replicating malware, e.g., worms.

In one embodiment, because a determination is made in check operation 218 that the call module is not in driver area 115 of kernel address space 105, the likelihood that the call module is malicious code is significant. For example, the call module is malicious code injected into the kernel heap or kernel stack as a result of a kernel mode buffer overflow attack. However, by terminating the critical OS function call, the critical OS function is prevented from being executed. By preventing execution of the critical OS function, damage, destruction or other exploitation of host computer system 102 is prevented.

As another example of protective action, the parent application including the call module and/or a malicious thread running within the context of the parent application is terminated. Termination of applications is well known to those of skill in the art and so is not discussed further for clarity of discussion. In one embodiment, the user of host computer system 102 is asked for and determines the protective action to be taken (or if no protective action is to be taken) in take protective action operation 228.

Flow moves from take protective action operation 228, optionally, to a notify host computer system user/administrator operation 230 (or directly to enable driver load/unload operation 224 if operation 230 is not performed or directly to exit operation 210 if operations 230, 224 are not performed). In notify host computer system user/administrator operation 230, the user of host computer system 102 and/or the administrator are notified that protective action has been taken on host computer system 102, e.g., that a call, a parent application and/or a call module have been terminated. The user and/or administrator can be notified using any one of a number of techniques, e.g., by using a pop up window, by writing to a file and/or otherwise by logging the event. Further, a notification can be provided to a security center.

From notify host computer system user/administrator operation 230, flow moves to enable driver load/unload operation 224 (or directly to exit operation 210 if enable driver load/unload operation 224 is not performed).

FIG. 3 is a diagram of a hooked operating system function call flow 300 in accordance with one embodiment of the present invention. Referring now to FIGS. 2 and 3 together, by exploiting a kernel mode buffer overflow, a malicious call module 302M containing malicious code is loaded into a kernel stack/heap 304 in non-driver area 113 and executed, e.g., because of a modified return address 306. For example, a kernel mode buffer overflow is exploited from hacker computer system 104.

Exploitation of buffer overflows is well known to those of skill in the art and so is not discussed to avoid detracting from the principals of the invention. For example, in "Blended Attacks Exploits, Vulnerabilities and Buffer-Overflow Techniques in Computer Viruses," Chien, E. and Ször, P., Virus Bulletin Conference, 2002, Virus Bulletin Ltd, pp. 1-35, herein incorporated in its entirety by reference, the Applicant as co-author describes exploitation of buffer overflows.

During execution of malicious call module 302M and performance of call to critical OS function operation 206, malicious call module 302M originates a critical OS function call 307 to a critical OS function. In one embodiment, malicious call module 302M originates critical OS function call 307 by making critical OS function call 307 directly. In another embodiment, malicious call module 302M originates critical OS function call 307 by calling another function, e.g., a subroutine, which, in turn, makes critical OS function call 307.

Critical OS function call 307 is routed to a hooked system service table 308. Hooked system service table 308 routes noncritical OS function calls directly to an operating system 310. However, hooked system service table 308 routes critical OS function calls to a hook module 312, e.g., a kernel mode module or kernel mode driver. In one embodiment, hook module 312 is part of malicious code blocking application 106.

As is well known to those of skill in the art, a system service table, sometimes called a dispatch table or a system call table, relates system calls to specific addresses within the operating system kernel. Hooked system service table 308 in accordance with one embodiment of the present invention, redirects critical OS function calls to hook module 312 and from the specific addresses within the operating system kernel to which the critical OS function calls would otherwise be directed.

In one embodiment, hook module 312 is used to stall a critical OS function call during stall call operation 212 of FIG. 2. Further, hook module 312 continues to stall the critical OS function call during determine location of call module operation 216 and call module in driver area check operation 218. Hook module 312 allows the critical OS function call to proceed to operating system 310 during allow call to proceed operation 220. Conversely, hook module 312 terminates the critical OS function call during take protective action operation 228.

Further, in one embodiment, hook module 312 determines if the last mode of operation was the kernel mode in check operation 208 and disables/enables driver loading and unloading in operations 214, 224, if performed.

In accordance with this embodiment, critical OS function call 307 is routed by hooked system service table 308 to hook module 312. Critical OS function call 307 is stalled by hook module 312 in stall call operation 212. A determination is made that the location of malicious call module 302M is in non-driver area 113 in determine location of call module operation 216, for example, using a stack trace-back as discussed further below in reference to FIG. 4.

In call module in driver area check operation 218, a determination is made that malicious call module 302M is not in driver area 115. Hook module 312 thus terminates critical OS function call 307 in take protective action operation 228.

By terminating critical OS function call 307, execution of a child application 316 is prevented. This, in turn, denies remote access thus preventing unauthorized access to host computer system 102 by malicious hackers and also by replicating malware, e.g., worms.

In contrast, a non-malicious call module 302NM, e.g., which does not include malicious code, is loaded into driver area 115 and executed. During execution of non-malicious call module 302NM and performance of call to critical OS function operation 206, non-malicious call module 302NM originates a critical OS function call 314 to a critical OS function.

Critical OS function call 314 is routed to hooked system service table 308. Critical OS function call 314 is routed by hooked system service table 308 to hook module 312. Critical OS function call 314 is stalled by hook module 312 in stall call operation 212. A determination is made that the location of non-malicious call module 302NM is in driver area 115 in determine location of call module operation 216, for example, using a stack trace-back as discussed further below in reference to FIG. 4.

In call module in driver area check operation 218, a determination is made that non-malicious call module 302NM is in driver area 115. Hook module 312 thus allows critical OS function call 314 to proceed in allow call to proceed operation 220. Accordingly, critical OS function call 314 is routed from hook module 312 to operating system 310. Operating system 310 causes execution of a child application 316, for example, allowing authorized remote access to host computer system 102.

Although FIG. 3 describes one example of a hooked operating system function call path, in light of this disclosure, those of skill in the art will understand that other techniques can be used to hook operating system function(s). The particular technique used depends, for example, on the particular operating system.

Figure 4:
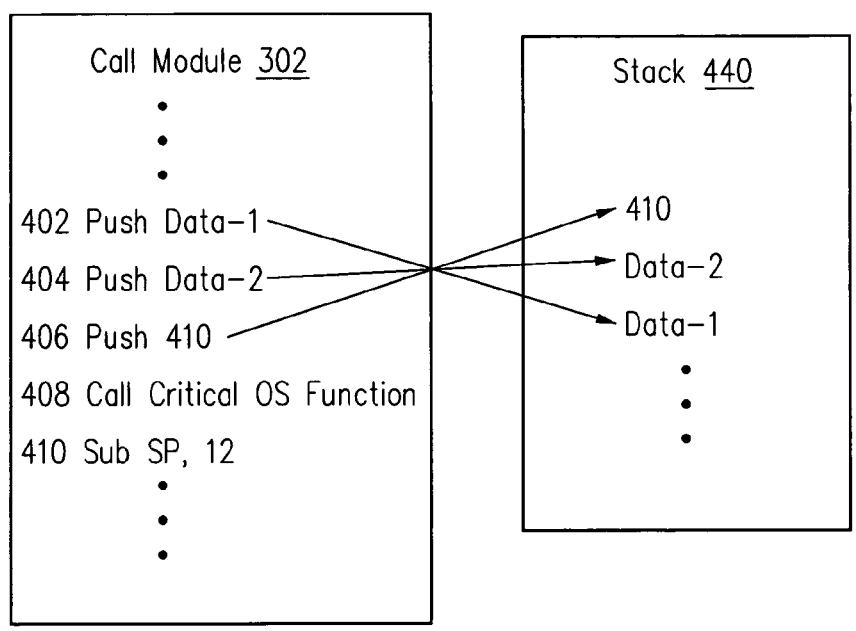
FIG. 4 is a pseudocode representation of a stack for use in determining the location of a call module in accordance with one embodiment of the present invention.

FIG. 4 is a pseudocode representation of a stack 440 used to determining the location of a call module 302 e.g., a malicious or non-malicious call module, in accordance with one embodiment of the present invention. Referring now to FIG. 4, call module 302 includes instructions 402, 404 and 406 that push Data-1, Data-2 and return pointer 410, respectively, on to stack 440. Call module 302 further includes an instruction 408 that calls a critical OS function and an instruction 410 that decrements the stack pointer for cleanup of stack 440 as those of skill in the art will understand.

Execution of instructions 402, 404 and 406 push Data-1, Data-2 and return pointer 410, respectively, on to stack 440 as shown by the arrows. Execution of instruction 408 causes a call to a critical OS function to be made. In one embodiment, call module 302 originates a call to a critical OS function during call to critical OS function operation 206 of FIG. 2 in the above manner.

In one embodiment, determine location of call module operation 216 is performed by analyzing the content of stack 440. In accordance with this embodiment, the content of stack 440 is analyzed to locate return pointer 410, which points to call module 302. More generally, return pointer 410 points to the location in kernel address space 105 of memory 114 (FIG. 1) in which call module 302 is located. For example, return pointer 410 points to a location in non-driver area 113 in the case when call module 302 contains malicious code or to a location in driver area 115 in the case when call module 302 is non-malicious.

Although FIG. 4 describes one example of pseudocode representation of a stack 440 used to determine the location in memory 114 of call module 302, in light of this disclosure, those of skill in the art will understand that other techniques can be used to determine the location of a call module that originated a critical OS function call. The particular technique used depends, for example, on the particular operating system.

Figure 5:
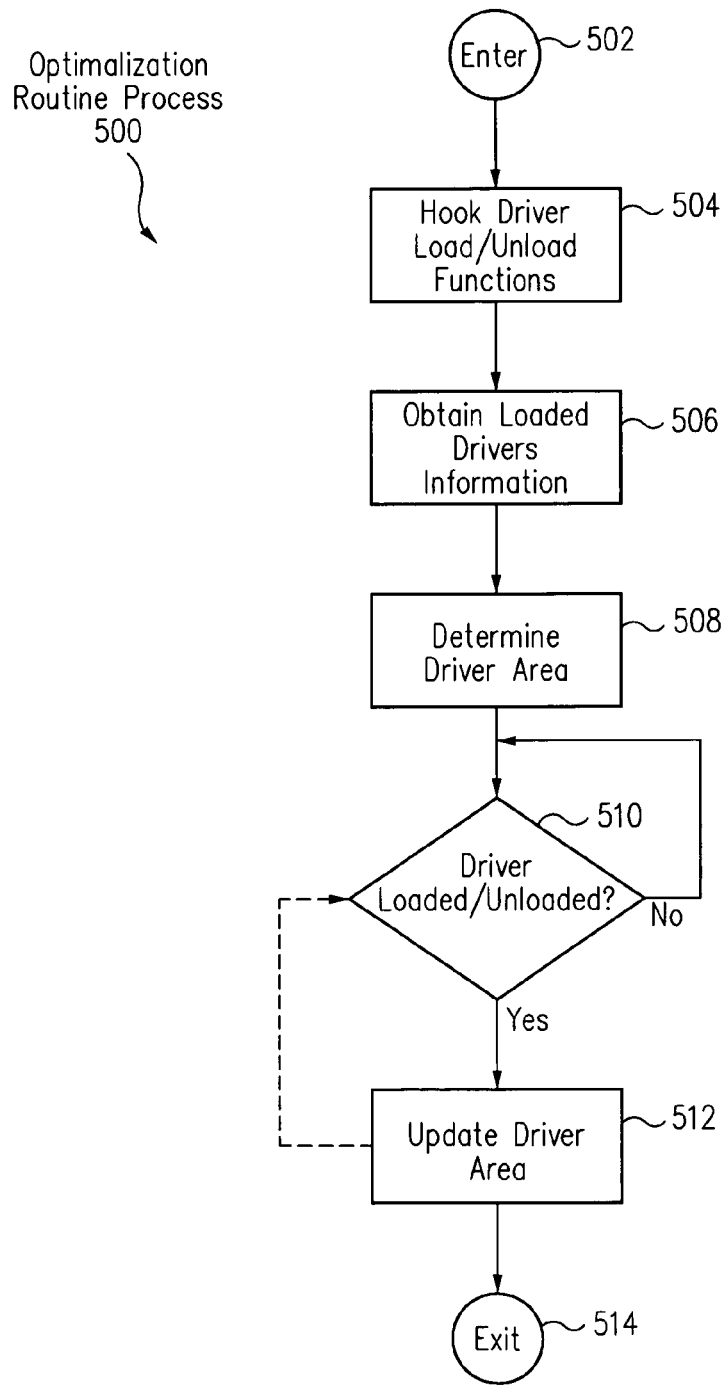
FIG. 5 is an optimization routine process for keeping a driver area of a host computer system updated in accordance with one embodiment of the present invention.

FIG. 5 is an optimization routine process for keeping driver area 115 of host computer system 102 updated in accordance with one embodiment of the present invention. Referring now to FIGS. 1 and 5 together, execution of malicious code blocking application 106 by processor 108 results in the operations of optimization routine process 500 as described below in one embodiment.

As discussed above, in various embodiments, driver area 115 is the area of kernel address space 105 occupied by a loaded kernel mode driver or by executable sections of a loaded kernel mode driver. In accordance with these embodiments, driver area 115 is dynamic and optimization routine process 500 is used to keep driver area 115 up-to-date.

From an enter operation 502, flow moves to a hook driver load/unload functions operation 504. In hook driver load/unload functions operation 504, driver load and/or unload functions of host computer system 102 that are responsible for loading and/or unloading drivers from kernel address space 105, respectively, are hooked. See Szor, commonly assignment U.S. patent application Ser. No. 10/371,945, filed on Feb. 21, 2003, entitled SAFE MEMORY SCANNING, which is herein incorporated by reference in its entirety, regarding hooking of a driver unload function.

By hooking the driver load and/or unload functions, malicious code blocking application 106 is informed when a driver is loaded into or unload from kernel address space 105. Further, by hooking the driver load and/or unload functions, loading and/or unloading of drivers can be disabled and enabled, e.g., in disable driver load/unload operation 214 and enable driver load/unload operation 224 of FIG. 2, respectively.

From hook driver load/unload functions operation 504, flow moves to an obtain loaded drivers information operation 506. In obtain loaded drivers information operation 506, information on the loaded drivers is obtained, e.g., using the ZwQuerySystemInformation( ) function. In one embodiment, the information includes a list of loaded drivers and the addresses in kernel address space 105 of the loaded drivers.

From obtain loaded drivers information operation 506, flow moves to a determine driver area operation 508. In determine driver area operation 508, driver area 115 is determined.

In one embodiment, a range table for the loaded drivers mapped code sections such as INIT and .TEXT is created. For example, the range table is a table of the address range for each loaded driver. In one embodiment, an address range for a loaded driver is defined by a starting address in kernel address space 105 and an ending address in kernel address space 105, where the loaded driver is loaded to kernel address space 105 starting at the starting address and ending at the ending address.

From determine driver area operation 508, flow moves to a driver loaded/unloading check operation 510. In driver loaded/unloading check operation 510, a determination is made as to whether a driver has been loaded into kernel address space 105 or unloaded from kernel address space 105. Recall that driver load/unload functions were hooked in operation 504 such that malicious code blocking application 106 is informed when a driver is loaded into or unload from kernel address space 105.

If a determination is made that a driver has not been loaded into kernel address space 105 or unloaded from kernel address space 105, flow remains at driver loaded/unloaded check operation 510. In contrast, if a determination is made that a driver has been loaded into kernel address space 105 or unloaded from kernel address space 105, flow moves to an update driver area operation 512.

In update driver area operation 512, driver area 115 is updated. In one embodiment, when a new driver is loaded into kernel address space 105, driver area 115 is increased to include the area occupied by the new driver. Conversely, when a driver is unloaded from kernel address space 105, driver area 115 is decreased to exclude the area occupied by the unloaded driver.

From update driver area 512, flow exits at an exit operation 514 or optionally returns to driver loaded/unloaded check operation 510.

In the above matter, driver area 115, which is dynamically changing as new drivers are loaded into kernel address space 105 and drivers are unloaded from kernel address space 105 is kept updated, sometimes called up-to-date.

Referring again to FIG. 1, malicious code blocking application 106 is in computer memory 114. As used herein, a computer memory refers to a volatile memory, a non-volatile memory, or a combination of the two.

Although malicious code blocking application 106 is referred to as an application, this is illustrative only. Malicious code blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, malicious code blocking application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, malicious code blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the malicious code blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the malicious code blocking functionality in accordance with one embodiment of present invention can be implemented in a wide variety of computer system configurations. In addition, the malicious code blocking functionality could be stored as different modules in memories of different devices. For example, malicious code blocking application 106 could initially be stored in server system 130, and then as necessary, a portion of malicious code blocking application 106 could be transferred to host computer system 102 and executed on host computer system 102. Consequently, part of the malicious code blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, malicious code blocking application 106 is stored in memory 136 of server system 130. Malicious code blocking application 106 is transferred over network 124 to memory 114 in host computer system 102. In this embodiment, network interface 138 and I/O interface 110 would include analog modems, digital modems, or a network interface card. If modems are used, network 124 includes a communications network, and malicious code blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   hooking a critical operating system function;
   stalling a call to the critical operating system function originating from a call module;
   determining a location of the call module in a kernel address space of a memory;
   determining whether the location is in a driver area of the kernel address space of the memory;
   determining that said call module is not in said driver area during said determining;
   taking protective action to protect a computer system;
   providing a notification that said protective action has been taken,
   wherein the call module is malicious code that has been injected into a kernel stack/heap through a malicious kernel mode buffer overflow attack.

2. The method of claim 1 further comprising terminating said call.

3. The method of claim 1 further comprising terminating a parent application comprising said call module.

4. The method of claim 1 further comprising determining whether said call module is a known false positive.

5. The method of claim 1 further comprising determining that said call module is in said driver area during said determining.

6. The method of claim 1 further comprising stalling said call.

7. The method of claim 6 further comprising:
   determining that said call module is in said driver area during said determining; and
   allowing said call to proceed.

8. The method of claim 1 further comprising determining if a last mode of operation is a kernel mode.

9. The method of claim 1 further comprising disabling loading and unloading of drivers into said kernel address space.

10. The method of claim 9, further comprising, subsequent to said determining whether the location is in a driver area of the kernel address space of the memory, enabling loading and unloading of said drivers into said kernel address space.

11. The method of claim 1 wherein said driver area is static.

12. The method of claim 1 wherein said driver area is dynamic.

13. The method of claim 12 further comprising keeping said driver area updated as drivers are loaded and unloaded from said kernel address space.

14. A method comprising:
   hooking driver load and unload functions;
   obtaining loaded driver information;
   determining a driver area in a kernel address space of a memory;
   determining whether a driver has been loaded into or unloaded from said kernel address space, wherein upon a determination that said driver has been loaded into or unloaded from said kernel address space,
   updating said driver area;
   stalling a call to a critical operating system function originating from a call module;

determining whether said call module is in said driver area;
determining that said call module is in said driver area; and
allowing said call to proceed.

15. The method of claim 14 wherein said driver area is dynamic.

16. A computer-program product comprising a tangible computer readable storage medium containing computer code comprising:
- a malicious code blocking application for hooking a critical operating system function;
- said malicious code blocking application for stalling a call to the critical operating system function originating from a call module;
- said malicious code blocking application for determining a location of the call module in a kernel address space of a memory;
- said malicious code blocking application further for determining whether the location is in a driver area of the kernel address space of the memory;
- said malicious code blocking application for determining that said call module is not in said driver area during said determining;
- said malicious code blocking application for taking protective action to protect a computer system;
- said malicious code blocking application for providing a notification that said protective action has been taken;
- wherein the call module is malicious code that has been injected into a kernel stack/heap through a malicious kernel mode buffer overflow attack.

* * * * *